Nov. 24, 1953     W. M. WREATHALL     2,660,094
TWO MEMBER OPTICAL OBJECTIVES
Original Filed July 16, 1951
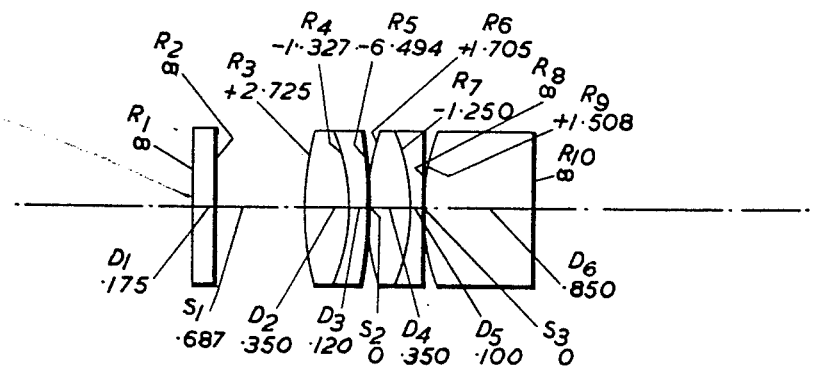
Inventor
William Michael WREATHALL
By
Emery Holcombe & Blair
Attorney Patented Nov. 24, 1953

2,660,094

UNITED STATES PATENT OFFICE 2,660,094

TWO MEMBER OPTICAL OBJECTIVE

William Michael Wreathall, Leicester, England, assignor to Taylor, Taylor & Hobson Limited, Leicester, England, a British company Original application July 16, 1951, Serial No. 236,949, now Patent No. 2,638,034, dated May 12, 1953. Divided and this application June 16, 1952, Serial No. 293,710

Claims priority, application Great Britain July 17, 1950

7 Claims. (Cl. 88—57)

This application is divisional from application Serial No. 236,949, filed on July 16, 1951, now Patent No. 2,638,034, issued May 12, 1953.

This invention relates to an optical objective, corrected for spherical and chromatic aberrations, coma and astigmatism and having a curved short-conjugate field, for projection or other purposes, and is concerned more particularly with a development of the invention forming the subject of U. S. A. Patent No. 2,502,543, dated April 4, 1950. The objective of such patent was primarily designed for use for the optical projection on to a screen of the images formed by electrical scanning on suitable targets in cathode ray tubes, as used for television purposes.

For this purpose, the objective according to the invention of such patent is corrected for spherical and chromatic aberrations, coma and astigmatism and comprises two members separated by an air space lying between 0.6 and 1.2 times the equivalent focal length of the rear member, the rear member consisting of three convergent achromatic doublets and having an overall axial length between .50 and .85 times such equivalent focal length, whilst the front member consists of a simple element having one surface slightly aspherical.

It should be made clear that the terms "front" and "rear" are herein used, in accordance with the usual convention, to relate to the sides of the objective respectively nearer to and further from the longer conjugate, so that when used for projection the light passes through the objective from the rear to the front.

For the television projection purposes, for which such invention was primarily developed, the focal length of the objective would usually be of the order of 5 to 12 inches and the semi-angular field covered would be, say, 17½ degrees.

The present invention is concerned with a development of such prior invention to make it suitable for use for apparatus other than television purposes, and especially for miniature radiographic cameras, for which a focal length as short as 2 inches and a semi-angular field of about 22½ degrees would be required, and for which a wider aperture and much greater light transmission are desirable.

To this end, according to the present invention, the objective comprises two members separated by an air space whose axial length lies between zero and .8 F (where F is the equivalent focal length of the rear member), the rear member having an overall axial length between 1.1 F and 2.2 F and consisting of two convergent doublets in front of a simple component each doublet having a convergent element in front of a divergent element, the more deeply curved of the two internal contacts in the rear member having a radius of curvature between .7 F and 1.5 F, whilst the front member consists of a simple element having one surface slightly aspherical.

The term "internal contact" is used herein to denote the assemblage of the two cooperating surfaces between two elements of a compound component, whether or not such surfaces are cemented together and whether or not such surfaces have exactly the same radius of curvature. When the two cooperating surfaces have slightly different radii of curvature, the radius of curvature of the internal contact is to be taken as the harmonic mean between the two radii of curvature.

The aspherical surface of the simple front member is constituted by a surface of revolution generated by the rotation about the $x$-axis, that is the optical axis of the objective, of a curve of the form $$x = ay^2 + by^4 + cy^6 + \ldots + \text{higher even powers of } y$$

wherein the coefficients $a$, $b$, $c$ . . . are constants and determine the degree of departure of the surface from true spherical form, the term "spherical" being used to include a sphere of infinite radius, that is a plane surface. It will, in fact, often be convenient in practice for the aspherical surface to consist of a figured plane surface, the figuring (that is, the departure of the surface from the true plane) being small at all radial distances from the axis. Thus the asphericity should usually be such that at no point does the departure from the osculating sphere at the vertex exceed .06 times the equivalent focal length of the rear member.

In the neighbourhood of the optical axis, the optical power of the front member is preferably less than one quarter of that of the rear member.

The objective is preferably such that its short-conjugate field corresponding to a flat long-conjugate field is spherically curved and concave towards the objective with radius of curvature between 1.0 F and 2.0 F. When the objective is used for photographic purposes, it is sometimes convenient to provide (in the manner fully described in the specification of application Serial No. 236,949 from which the present application is divided) an additional element behind the objective with its rear surface shaped and positioned to correspond to the short-conjugate field, to afford a surface against which a photographic film can be pressed.

The Abbé V number of the material of each convergent element in the rear member is preferably greater than 52, and the Abbé V number of the material of each divergent element in the rear member is preferably less than 38.

The Abbé V number of the material of the front member exceeds 45.

The front surfaces of the components of the rear member are preferably all convex to the front.

The single figure of the accompanying drawings illustrates a convenient practical example of objective according to the invention.

Numerical data for this example are given in the following table, in which $R_1 R_2$ ... represent the radii of curvature of the individual surfaces counting from the front, the positive sign indicating that the surface is convex to the front and the negative sign that it is concave thereto, $D_1 D_2$ ... represent the axial thicknesses of the individual elements, and $S_1 S_2$ ... represent the axial air separations between the components. The table also gives the mean refractive indices $n_D$ for the D-line and the Abbé V numbers of the materials used for the various elements.

The insertion of equals (=) signs in the radius columns of the table, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the table may have to be treated as negative for some calculations as is well understood in the art.

In this table the dimensions are given in terms of the equivalent focal length of the rear member, which is taken as unity. The shape of the aspherical surface is defined by the equation to its generating curve, the $x$-coordinate representing the radial distance from the optical axis and the $y$-coordinate the distance in the direction of the optical axis from the transaxial plane through the vertex of the surface towards the rear of such plane.

| Radius | Thickness or Air Separation | Refractive Index $n_D$ | Abbé V Number |
|---|---|---|---|
| $R_1$ = Aspherical surface | | | |
| | $D_1$ = .175 | 1.6123 | 58.5 |
| $R_2 = \infty$ | | | |
| | $S_1$ = .087 | | |
| $R_3$ = +2.725 | | | |
| | $D_2$ = .350 | 1.6910 | 54.8 |
| $R_4$ = −1.327 | | | |
| | $D_3$ = .120 | 1.7004 | 30.3 |
| $R_5$ = −6.494 | | | |
| | $S_2$ = 0 | | |
| $R_6$ = +1.705 | | | |
| | $D_4$ = .350 | 1.6910 | 54.8 |
| $R_7$ = −1.250 | | | |
| | $D_5$ = .100 | 1.7004 | 30.3 |
| $R_8 = \infty$ | | | |
| | $S_3$ = 0 | | |
| $R_9$ = +1.808 | | | |
| | $D_6$ = .850 | 1.6910 | 54.8 |
| $R_{10} = \infty$ | | | |

The coordinates of the aspherical surface $R_1$, are determined by the equation $$x = .09474 y^2 - .07286 y^4 + \text{higher order terms}$$

This example is especially useful for photographic purposes, as for example for radiographic cameras, and in such use it is often convenient to employ a register plate consisting of a simple element whose rear surface is located in the image position and is shaped to the curvature of the image surface of the objective, so that the photographic film can be pressed into contact with such plate. This involves some slight modification to the numerical data given in the above table, more especially in the shape of the front member and its spacing from the rear member to accommodate the slight divergence of the register plate, in a manner analogous to that fully described in the specification of application No. 236,949 above mentioned.

In this example the short-conjugate field is concave to the objective with radius of curvature 1.340 F and is axially distant .235 F behind the surface $R_{10}$, whilst the long-conjugate field is flat at distance 8.620 F in front of the surface $R_1$, the magnification of the objective being ×8.620. The optical power of the front member in the neighbourhood of the optical axis is .116 times that of the rear member, and the numerical aperture of the objective is .6.

The rear member consists of two convergent doublets, each having a convergent element in front of a divergent element, in front of a convergent simple component. The two internal contacts are concave to the front, and the more deeply curved is in the middle doublet component and has a radius of curvature 1.250 F. The overall axial length of the rear member is 1.770 F. The three convergent elements are all made of material having Abbé V number 54.8, and the material used for the two divergent elements has Abbé V number 30.3.

This example gives a wide aperture and a high light transmission of the order of twice that of the example described in U. S. patent specification No. 2,502,543 referred to above.

The overall curvature of the aspherical surface on the front member may be varied, if desired, in a manner analogous to that described in the specification of U. S. A. Patent No. 2,479,907 dated August 23, 1949, to give substantially the same degree of correction for the objective working at slightly different conjugates and with slightly different separations between the front and rear members.

What I claim as my invention and desire to secure by Letters Patent is:

1. An optical objective corrected for spherical and chromatic aberrations, coma and astigmatism and having a curved short-conjugate field, and comprising a rear member having an overall axial length between 1.1 F and 2.2 F, where F is the equivalent focal length of the rear member, and consisting of two convergent doublets in front of a simple component each doublet having a convergent element in front of a divergent element, the more deeply curved of the two internal contacts in the rear member having a radius of curvature between .7 F and 1.5 F, and a front member separated from the rear member by an air space whose axial length lies between zero and .8 F and consisting of a simple element having one surface slightly aspherical, the departure of such surface from the osculating sphere at the vertex of the surface at no point exceeding .06 F.

2. An optical objective as claimed in claim 1, in which the short-conjugate field of the objective corresponding to a flat long-conjugate field is spherically curved and concave towards the objective with radius of curvature between 1.0 F and 2.0 F.

3. An optical objective as claimed in claim 2, in which in the neighbourhood of the optical axis the optical power of the front member is numerically less than one quarter of that of the rear member.

4. An optical objective as claimed in claim 3, in which the front surfaces of all the components of the rear member are convex to the front.

5. An optical objective as claimed in claim 1, in which in the neighbourhood of the optical axis the optical power of the front member is numerically less than one quarter of that of the rear member.

6. An optical objective as claimed in claim 1, in which the front surfaces of all the components of the rear member are convex to the front.

7. An optical objective as claimed in claim 1, in which in the neighbourhood of the optical axis the optical power of the front member is numerically less than one quarter of that of the rear member, and the front surfaces of all the components of the rear member are convex to the front, the Abbé V number of the material of each convergent element in the rear member being greater than 52 and the Abbé V number of each divergent element in such member being less than 38.

WILLIAM MICHAEL WREATHALL.

References Cited in the file of this patent

UNITED STATES PATENTS

| Number | Name | Date |
|---|---|---|
| 2,332,930 | Rinia | Oct. 26, 1943 |
| 2,468,564 | Luneberg | Apr. 26, 1949 |
| 2,479,907 | Cox | Aug. 23, 1949 |
| 2,482,698 | Tillyer | Sept. 20, 1949 |
| 2,502,543 | Warmisham | Apr. 4, 1950 |